US008761007B1

(12) United States Patent
Damle et al.

(10) Patent No.: US 8,761,007 B1
(45) Date of Patent: Jun. 24, 2014

(54) METHOD AND APPARATUS FOR PREVENTING A MOBILE DEVICE FROM CREATING A ROUTING LOOP IN A NETWORK

(75) Inventors: Ameya Damle, Santa Clara, CA (US); Fan Zhao, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 1069 days.

(21) Appl. No.: 12/603,422

(22) Filed: Oct. 21, 2009

Related U.S. Application Data

(60) Provisional application No. 61/107,150, filed on Oct. 21, 2008.

(51) Int. Cl.
H04L 12/26 (2006.01)
(52) U.S. Cl.
USPC .............................. 370/229; 370/248; 370/254
(58) Field of Classification Search
USPC .................................. 370/242, 248, 229, 254
See application file for complete search history.

(56) References Cited

U.S. PATENT DOCUMENTS

| 2004/0047348 | A1* | 3/2004 | O'Neill ........................ 370/389 |
| 2010/0054133 | A1* | 3/2010 | Schuringa et al. ............ 370/241 |
| 2010/0322083 | A1* | 12/2010 | Qiang ........................... 370/248 |

* cited by examiner

Primary Examiner — Yemane Mesfin
Assistant Examiner — Henry Baron

(57) ABSTRACT

A method and apparatus for preventing a user equipment (UE) from forming of a routing loop in a network. The method includes maintaining a list of one or more home addresses associated with the user equipment (UE), in which each home address has been previously associated with the user equipment (UE) by a corresponding packet data network gateway (PDN GW). In response to a request to update a care-of address in a binding cache entry of a packet data network gateway (PDN GW) in the network, the method further includes comparing an address to be used to update the care-of address with the one or more home addresses in the list. If the address to be used to update the care-of address matches a home address in the list, then the update is rejected.

6 Claims, 12 Drawing Sheets

FIG. 3 *(PRIOR ART)*

METHOD AND APPARATUS FOR PREVENTING A MOBILE DEVICE FROM CREATING A ROUTING LOOP IN A NETWORK

CROSS-REFERENCE TO RELATED APPLICATIONS

This disclosure claims the benefit of U.S. Provisional Application No. 61/107,150, filed Oct. 21, 2008, which is incorporated herein by reference.

FIELD

The present disclosure generally relates to wireless networks.

BACKGROUND

In a host-based mobility protocol, e.g., DSMIPv6, a user equipment (UE) (or mobile node) typically extends its Internet Protocol (IP) stack and implements IP mobility signaling as the UE moves and changes its point of attachment. For this reason, DSMIPv6 is often referred as a client MIP (CMIP).

FIG. 1 illustrates a conventional network 100 including a user equipment (UE) 106, an access router (AR) 108, and a home agent (HA) 110. As shown in FIG. 1, user equipment 106 is connected to a home network 104 via a visited network 102. FIG. 2 illustrates a conventional attach procedure 200 during which a user equipment 106 gains network connectivity to a home network 104 via a foreign link (visited network 102).

Referring to FIG. 2, at step 202, user equipment 106 performs a layer 2 specific attach procedure with access router 108. At step 204, user equipment 106 performs a layer 3 specific procedure to configure an IP address on an interface of user equipment 106. By performing a home link detection procedure, user equipment 106 detects that user equipment 106 is not at home and therefore, the IP address previously obtained is a care-of address (CoA). At step 206, user equipment 106 then initiates a bootstrapping procedure to obtain an IP address of home agent 110, if not available, using either DHCP or DNS. At step 208, user equipment 106 runs an IKEv2 protocol with home agent 110 to establish an IPSec security association. User equipment 106 can also obtain a home address (HoA) and a home network prefix during this procedure.

At step 210, user equipment 106 registers the binding between the care-of address and the home address in a Binding Update message with home agent 110. Upon receiving this Binding Update message, home agent 110 creates a binding between the care-of address and the home address in a Binding Cache entry. At step 212, a Binding Acknowledgement message, if requested, is sent back from home agent 110 to notify user equipment 106 of the status of the Binding Update procedure. At step 214, user equipment 106 gains network connectivity and can send or receive data traffic from a correspondent node (CN) 112 at the current point of attachment.

As shown in FIG. 2, the Mobile IPv6 binding update procedure contains only at most two steps: (i) sending the binding update message from the UE to the PGW (home agent), and (ii) receiving the binding acknowledgement message sent from the PGW (home agent) to the UE, if requested. The security model of this mechanism is that the PGW authenticates the UE during the IPsec security association setup procedure based on the UE identity (such as the IMSI in the 3GPP standard) and the associated security credential. However, in reality, a malicious attacker can obtain a prepaid cell phone, for example, from any store without presenting a real user identity. Therefore, should the attacker launch an attack and such attack is detected, a law enforcement agency will not be able track down the real identity of the attacker.

Creation of Routing Loops in a Network

A routing loop can be created in the network by a malicious UE which while being connected to multiple PDN GWs tries to modify the binding cache in such a way that the PDN GWs forward the packets to one other forming a routing loop. In the example shown in FIG. 3, a UE 302 connects to a trusted/untrusted access network 304 and receives a local care-of address (CoA) and initiates a DSMIPv6 bootstrapping procedure. The UE then connects to one PDN GW (PGW #1) and receives a Home address (HoA1) for that PDN GW. The UE 302 may then send a binding update message to create binding cache between HOA1→COA1 in the PDN GW#1. The UE can subsequently perform a bootstrapping procedure with a second PDN GW (PGW #2) using the IP address from PDN GW#1—i.e., using HoA1 for bootstrapping procedures as the care-of address—and receive HoA2 from PDN GW#2. The UE 302 may send binding update message to PDN GW#2 to create a binding cache entry as HoA2→HoA1, thus creating an erroneous entry. The UE 302 may then send a Binding update message again to PGW #1 to update the binding cache entry in such a way that HoA1→HoA2, thus creating a routing loop 306 between PDN GWs. Packets forwarded to any of the Home addresses (HoA1 or HoA2) would continue circulating between the PDN GWs.

As a second example, when the UE 302 connects to access network 304 and obtains a valid care-of address, the UE 302 performs the bootstrapping procedure and sets up connectivity to PGW #1 and PGW #2 by obtaining the home addresses, HoA1 and HoA2 from PGW #1 and PGW #2, respectively. The UE 302 then performs the binding update procedure with PGW #1 and PGW #2, respectively. Later, the UE 302 tries to update the Binding Cache entry at PGW #1 and PGW #2 to create a routing loop. For example, the packet sent to PGW #1 could be as follows: CoA→PGW #1||HoA1→PGW #2||HoA2→PGW #2||BU. Note that the inner IP headers and payloads in this packet could be encrypted. When PGW #1 receives and verifies such packet, PGW #1 forwards the inner packet HoA1→PGW #2||HoA2→PGW #2||BU to PGW #2. Such packet when received will be considered as a valid binding update message by PGW #2; therefore, the binding cache entry at PGW #2 is updated to use the HoA1 as a care-of address. Similarly, the packet sent to PGW #2 could be as follows: CoA→PGW #2||HoA2→PGW #1||HoA1→PGW #1||BU. Note that the inner IP headers and payloads in this packet could be also encrypted. And after processing, the binding cache entry at PGW #1 is updated to use the HoA2 as a care-of address. Now the routing loop is formed.

In addition to sending malicious packets simultaneously to PGW #1 and PGW #2 as described above, the malicious UE 302 may send such attack packets sequentially. For example, the UE 302 may firstly update the binding cache entry at PGW #2 by sending the following packet: CoA→PGW #1||HoA1→PGW #2||HoA2→PGW #2||BU. Note that the inner IP headers and payloads in this packet could be encrypted. After processing, the binding cache entry at PGW #2 uses the HoA1 as a care-of address. Now, the UE 302 sends the following packet: CoA→PGW #1||HoA1→PGW #2||HoA2→PGW #1||HoA1→PGW #1||BU. Note that the inner IP headers and payloads in this packet could also be encrypted. This packet is received by PGW #1 and forwarded to PGW #2 and finally forwarded to PGW #1; PGW #1 processes the packet as a binding update message and modifies the binding cache entry to use the HoA2 as a care-of address. Now the routing loop is formed between PGW #1 and PGW #2.

In a third example, the UE 302 may send malicious packets to PGW #1 and PGW #2, respectively. The packet sent to PGW #1 can appear as follows: CoA→PGW #1∥HoA2→PGW #1∥home address destination option (HoA1)∥BU and the packet sent to PGW #2 can appear as follows: CoA→PGW #2∥HoA1→PGW #2∥home address destination option (HoA2)∥BU. Note that the inner IP headers and payloads could be encrypted. After PGW #1 and PGW #2 process the received packets, the routing loop is formed.

Note that even though ingress filtering can be deployed at the ePDG or the trusted non3GPP access network to prevent a UE from sending messages with an invalid care-of address, this does not completely solve the problem as UE can piggyback a binding update message in the IPv6 payload and use the valid care-of address to send it to one PDN GW and have final destination as another PDN GW. This attack case is also illustrated by the scenario described above. Furthermore, besides the Mobile IP tunnel, other tunnels, such as an IPsec tunnel established between network entities, can be used for packet forwarding; therefore, an attacker may use the IPsec tunnel together with the Mobile IP tunnel during attacks for further evading security check and detection.

There are conventional solutions which would enable a PDN GW to add an identifier (or value) in data packets, which identifier would help the PDN GW to detect a routing loop and hence drop such packets and delete the corresponding binding cache entries. However such solutions do not prevent routing loops from being created in the first place, thus lots of network resources are generally consumed before such routing loops are detected and terminated. Furthermore, the solution of using a static identifier, such as the IP address of the PGW, has the following drawbacks: 1) since such identifier may be well known, a malicious attacker may eavesdrop a valid packet sent to a specific PGW, and then replay such packet with the identifier of such PGW added to such PGW, which may trigger the PGW to delete the binding cache entry of an innocent UE because the PGW thought the packet is forwarded through a routing loop; 2) using such identifier may leak information of operator's network, and such information is usually private and sensitive. It is challenging for a PGW to keep tracking a large number of random numbers added to each packet, given that a PGW may serve hundreds of thousands of UEs simultaneously. This not only requires a lot of memory consumption, but also introduces processing delay caused by searching and comparing the stored random numbers.

There is another proposed solution that tests the reachability of the care-of address received in the binding update message by sending an ICMP echo message to such care-of address. However, such solution still allows the routing loop to be formed and such routing loop may stay until the PGW removes (or terminates) the routing loop due to failure to receive an ICMP reply message within a certain time of period. The UE may repeatedly launch the attack to form the routing loop in the PGWs to maximize the effect of the attack.

Preventing a UE from Connecting Through DSMIPv6

Consider a scenario, as shown in FIG. 4, where a UE supporting DSMIPv6 connects to a network 400 that selects PMIPv6 for providing connectivity to the UE. The network 400 may however also support DSMIPv6. The UE when connecting to such network would be provided with a Home address say HoA1, by performing PMIPv6 procedures to the PDN GW. The UE receives this IP address and if no IP mobility mode selection is performed and UE does not know about the selected protocol, then the UE would treat this IP address as the Care-of Address to use in the DSMIPv6 procedure. The UE would first discover the PDN GW which may or may not be the same PDN GW. Then the UE will initiate the bootstrapping procedure and create a binding cache entry. If a different PDN GW is selected then packets are forwarded from PDN GW#2 to PDN GW#1 thus creating unnecessary overhead on the network. Moreover the network does not want UE to use DSMIPv6 at all and hence decided to use PMIPv6. Currently, there is no mechanism for the network to stop such a UE from creating a DSMIPv6 tunnel over the already existing PMIPv6 tunnel.

SUMMARY

In general, in one aspect, this specification describes techniques for preventing the formation of routing loops in a network. The techniques can prevent the formation of routing loop in applications in which ingress filtering is deployed as well as applications in which ingress filtering is not deployed. In one aspect, this disclosure provides a solution by which a network can prevent a UE from connecting to the network using DSMIPv6 when PMIPv6 is selected.

In one aspect, the disclosure describes a method for preventing a user equipment (UE) from forming of a routing loop in a network, in which the user equipment (UE) uses a host-based mobility protocol to connect to a plurality of packet data network gateways (PDN GWs) in the network. The method includes maintaining a list of one or more home addresses associated with the user equipment (UE), in which each home address has been previously associated with the user equipment (UE) by a corresponding packet data network gateway (PDN GW). In response to a request to update a care-of address in a binding cache entry of a packet data network gateway (PDN GW) in the network, the method further includes comparing an address to be used to update the care-of address with the one or more home addresses in the list. If the address to be used to update the care-of address matches a home address in the list, then the update is rejected.

BRIEF DESCRIPTION OF THE DRAWINGS

Like reference symbols in the various drawings indicate like elements.

DETAILED DESCRIPTION

Network Without Ingress Filtering

In one implementation, this disclosure introduces a new mechanism for a PDN GW to inform an HSS/AAA (authentication, authorization and accounting) of the Care-of Address that a UE is using to establish an IKEv2 security association with the HSS/AAA during authentication, and the HSS/AAA can check the Care-of Address with the list of PDN addresses currently allocated to the UE. If the UE is already connected to one or more PDN GWs and is trying to use a home address as a care-of address with an intention of creating a routing loop in the network, then the HSS/AAA rejects the authentication.

Figure 1:
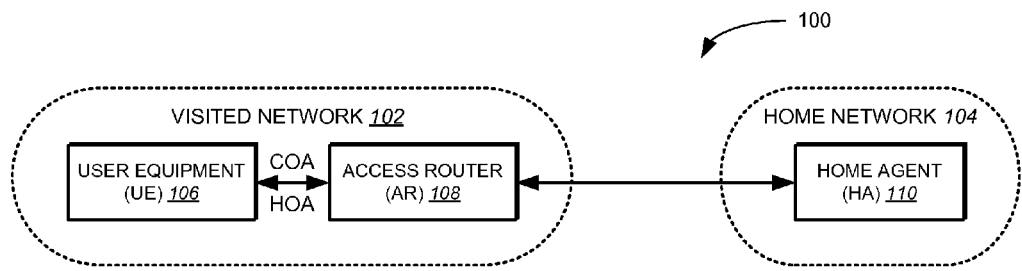
FIG. 1 illustrates a conventional network including a user equipment, access router, and home agent.
Figure 2:
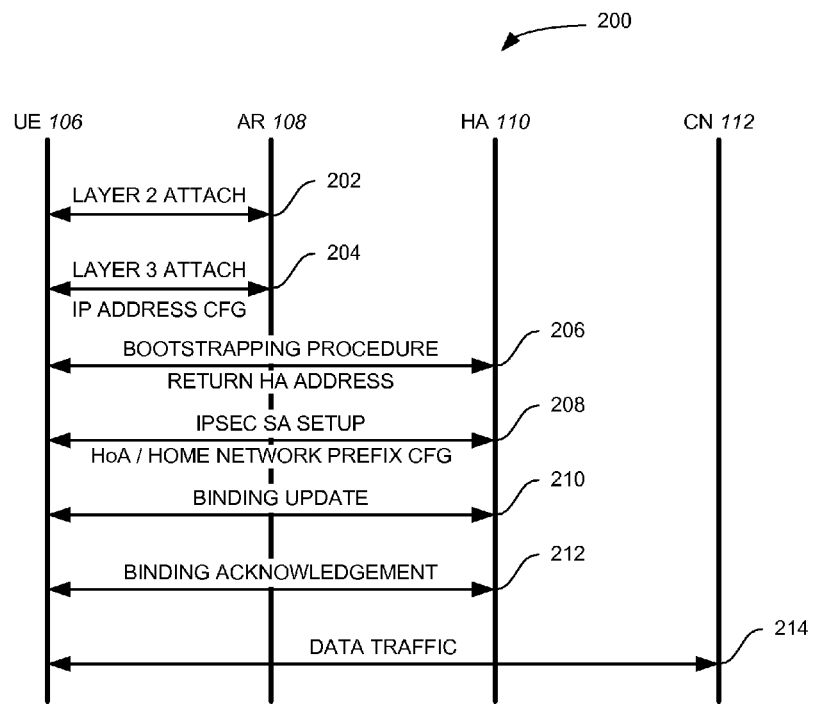
FIG. 2 illustrates a conventional attach procedure.
Figure 3:
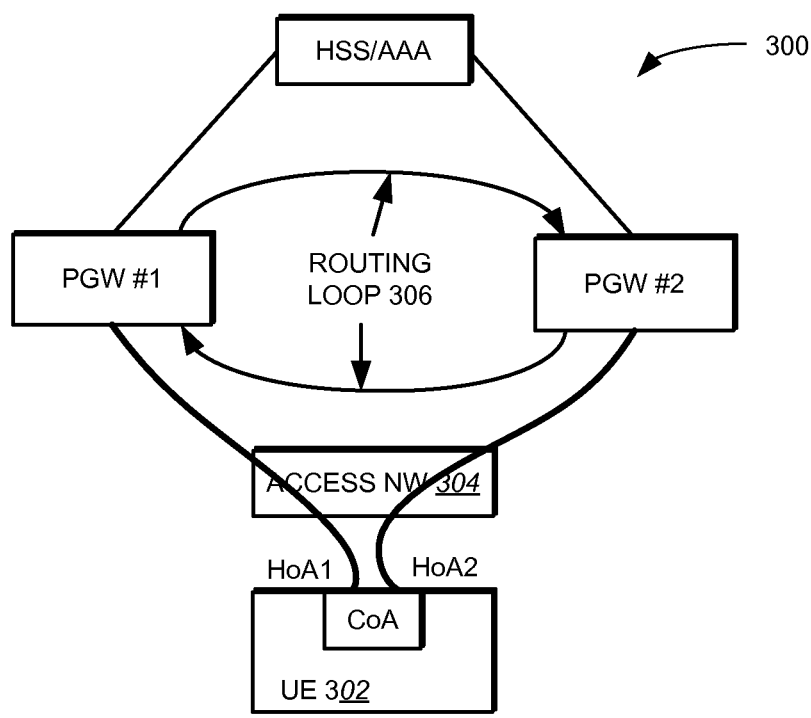
FIG. 3 illustrates a routing loop in a network.
Figure 4:
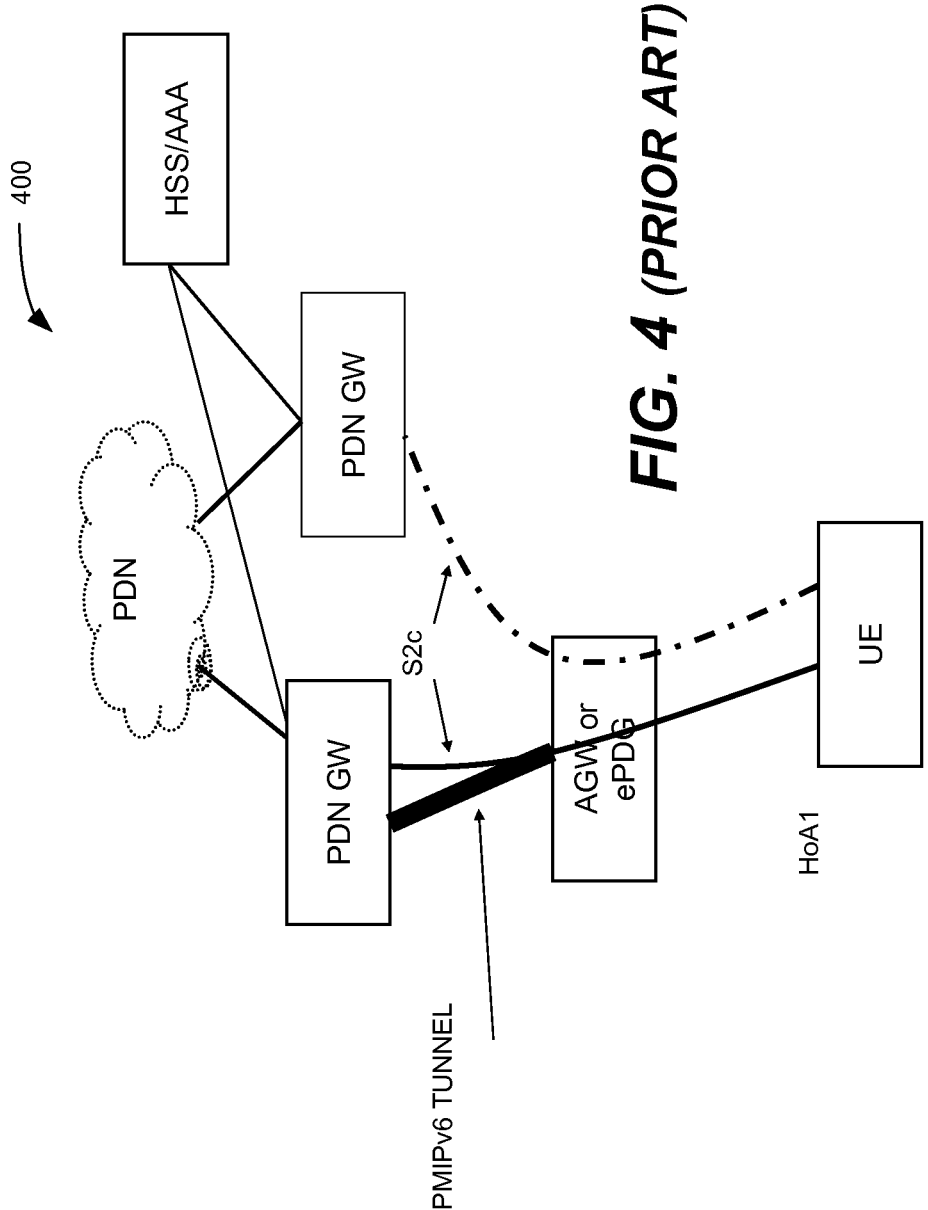
FIG. 4 illustrates an example network.
Figure 5:
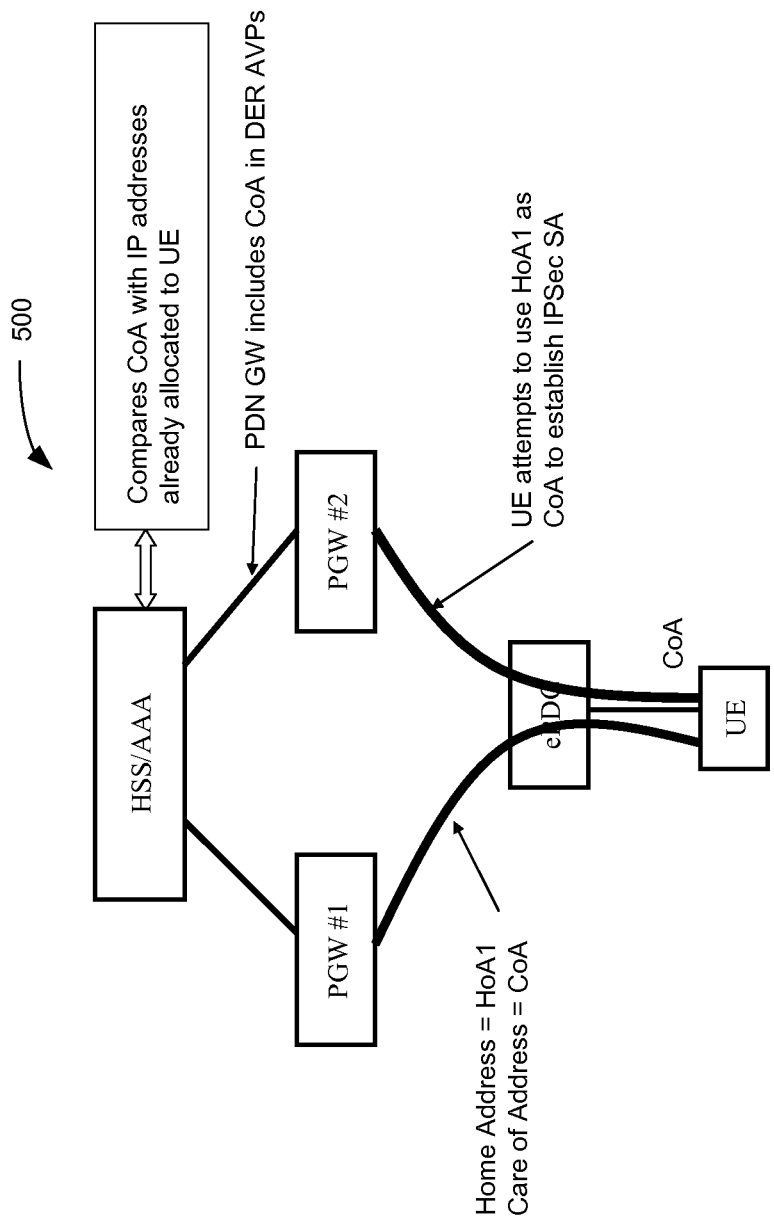
FIG. 5 illustrates an example network.

Consider the example network 500 illustrated in FIG. 5. A UE is allowed to use DSMIPv6, and the network 500 selects it to be used and hence allocates local care-of address to the UE, say CoA. After receiving local care-of address, the UE first discovers the PDN GW and then initiates DSMIPv6 bootstrapping procedures to create IPSec security association with the PDN GW#1. The UE requests allocation of Home address to be used for this PDN connection. Let's assume that the UE is allocated HoA1 as the home address. Now let's assume that the UE starts a connection with a second PDN, through PDN GW#2. It is assumed that in this scenario the network 500 does not implement ingress filtering. Hence a UE can use Home address (HoA1 obtained from PDN GW#1) as care-of address to send packets to PDN GW #2.

A malicious UE may try to use the home address obtained from PDN GW #1 as a care-of address to PDN GW #2 for all the DSMIPv6 bootstrapping procedures. To avoid this home address being registered as care-of address for $2^{nd}$ PDN connection, the PDN GW shall send the care-of address provided by the UE, in this the Home address obtained from PDN GW #1 to the HSS/AAA during authentication. As an example, one of the ways that PDN GW provides this information is by using one of the AVPs in Diameter EAP request message. Specifically, in one implementation, an AVP is carried in a DER message during IKEv2 SA setup to solve the problem of a malicious UE trying to create a routing loop in the network.

Upon reception of this AVP in the DER message, the HSS/AAA shall compare the care-of address with the list of PDN addresses that are already allocated to the UE for other PDN connections. So in this case, the HSS/AAA shall find a match between the care-of address being HoA1 and one of the allocated addresses as HoA1. This being an erroneous situation only generated by malicious UE, the HSS/AAA shall reject the authentication so that the malicious UE is unsuccessful in creating binding cache entries in the PDN GWs which would create routing loop in the network.

Figure 6:
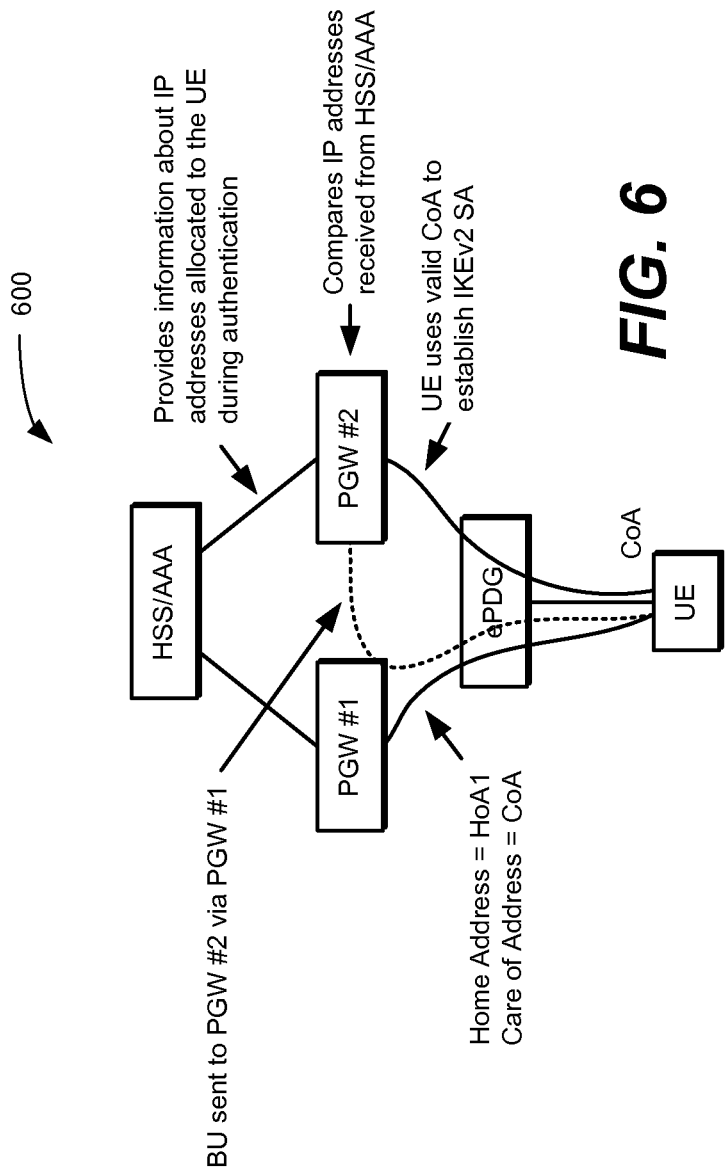
FIG. 6 illustrates an example network.

In one implementation, this disclosure also introduces a new mechanism for HSS/AAA to inform the Home Agent (HA) or a PDN GW acting as Home Agent of one or more IP addresses being allocated to a particular UE in the case that initial authentication with this PDN GW succeeds because of UE using valid care-of address to establish Ipsec SA. The information provided by the HSS/AAA is then checked by PDN GW when the PDN GW receives a binding update message. The PDN GW compares whether the Care-of address matches any of the addresses in the list of addresses allocated to the UE. If there is a match then the PDN GW rejects the binding update message and terminates the IPSec SA for that PDN connection. FIG. 6 illustrates a network 600 which implements such techniques. The techniques allows network 600 to prevent any routing loops being created by a malicious UE.

The information from HSS/AAA can be delivered to the PDN GW/HA either during authentication or immediately after authentication. Based on the information regarding IP address received during authentication for a UE, the PDN GW can know when it receives the binding update message, if the UE is using one of its allocated Home addresses as the Care-of address and thus can reject the UE based on that information.

Following is an example of the procedure to be used to prevent a routing loop from being created in a network where ingress filtering is done and a UE sends a message to PDN GW#2 via PDN GW#1 to modify a binding cache entry (BCE).

Referring to FIG. 5 and/or FIG. 6, after receiving a local care-of address, the UE first discovers the PDN GW and then initiates DSMIPv6 bootstrapping procedures to create IPSec security association with the PDN GW#1. The UE requests allocation of Home address to be used for this PDN connection. Let's assume that UE is allocated HoA1 as the home address. Now let's assume that UE starts connection with a second PDN, through PDN GW#2. Since ingress filtering is provided, the UE is not capable of using HoA1 to send any messages to PDN GW#2 as AGW/ePDG would drop these packets. Hence, lets assume that the UE uses valid care-of address to create IPSec SA with the PDN GW#2 and receives Home address (HoA2) from that PDN GW. Now a malicious UE may be able to tunnel a packet to PDN GW#2 in such a way that it beats the ingress filtering by sending the Binding Update message to bind HoA2 with care-of address as HoA1 to PDN GW#2 encapsulated in a payload of a packet where the care-of address matches the local care-of address and destination address is PDN GW#1. PDN GW#1 would see the contents and realize that the packet is destined for PDN GW#2 and thus forward the packet to PDN GW#2. This would create an invalid binding cache entry in PDN GW#2. If similar packet is sent to PDN GW#1 via PDN GW#2 then a routing loop would be created.

In this scenario when the UE initially authenticates with PDN GW#2, the PDN GW includes CoA (the valid CoA) as described above in a DER message. The HSS/AAA checks this CoA with the allocated PDN addresses allocated to the UE. Since in this case the CoA is valid, the CoA would not match any of the allocated PDN addresses and hence authentication would succeed. In that case, the HSS/AAA shall send the list of PDN addresses to the PDN GW. As an example, one of the way this information can be provided by HSS/AAA to the PDN GW by adding an AVP in the DEA message. The PDN GW shall store this information and check the information with the care-of address that the PDN GW receives in the Binding Update message. If the care-of address in the binding update message matches one of the PDN addresses in the stored list then the PDN GW rejects the binding update and deletes the binding cache entry if any and terminates the SA. Thus creation of routing loop is prevented by the PDN GW.

One further optimization to ensure that all the PDN GWs are capable of preventing routing loops in this scenario is that whenever UE requests a new IP address—i.e. connects to a new PDN GW—the HSS/AAA will send information about allocated IP addresses to all the PDN GWs that the UE is connected with.

Preventing DSMIPv6 Connection Over PMIPv6 Tunnel

In a scenario where a DSMIPv6 capable UE connects to a network where PMIPv6 is selected for connectivity even though network supports DSMIPv6 and no indication of selected mobility protocol is received by the UE, then the UE shall attempt to connect to the PDN using DSMIPv6. The UE will assume that the IP address received is the local care-of address, though the address is actually obtained by running PMIPv6 procedures by the AGW. The UE may discover either the same or different PDN GW and try to connect to that PDN GW using DSMIPv6. In that case the solution described above of a PDN GW forwarding the care-of address to the HSS/AAA can be used to prevent creation of a routing loop in this scenario.

When a UE attempts to bootstrap with the PDN GW with the Home address assigned by PMIP as care-of address, then PMIP will forward this to HSS/AAA which on comparing with the allocated address information would yield a match. Thus the HSS/AAA can reject the UE and thus prevent the UE from connecting using DSMIPv6.

First Routing Loop Prevention Mechanism/Technique

With this solution, once receiving a reverse-tunneled packet from the UE, the HA verifies such packet based on Mobile IP protocols firstly. If such verification succeeds and such packet does not contain a special type of IP field/option, the HA applies a specific cryptology algorithm on the care-of address in the received packet. For example, the output=hash (care-of address). Such output is included in an IP field/option and carried in the forwarded packet. Such field/option, if present, must not be modified by any other intermediate router during packet forwarding, except when such packet is processed as a reverse-tunneled data packet based on an existing binding cache entry at the home agent. As an example, such IP field/option can be a new type of IPv6 destination option—referred to herein as a "care-of address" option.

Figure 7:
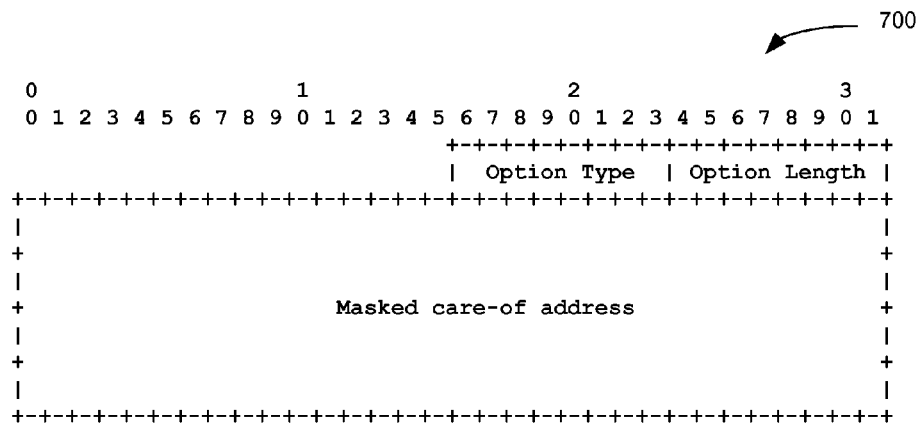
FIG. 7 illustrates an example format of a care-of address (CoA) option.

FIG. 7 shows an example format 700 of a care-of address option. The Option Type field can be assigned by IRNA, and uniquely identifies the care-of address option. In one implementation, the Option Length field in an 8-bit unsigned integer, and identifies the length of the option in octets excluding the Option Type and Option Length fields. In one implementation, the Option Length field is set to 16 if an IPv6 care-of address is included and MUST be set to 4 if an IPv4 care-of address is included. In one implementation, the output of making the IPv6 or IPv4 Care-of Address=H(care-of address). In order to conceal the real care-of address of the UE sending the packet, this option contains the output when the PGW applies a cryptography algorithm in the real care-of address. As an example, such algorithm can be a secure hash function, such as SHA1. Other algorithm is also possible as long as the output cannot be reversed to disclose the real care-of address.

Note that the format 700 shown in FIG. 7 is just an example and other formats are possible. For example, it is possible to have two different types of options, one for IPv4 address and the other for IPv6 address. Or it is possible to have a subfield inside this new type of option to indicate whether the care-of address carried is an IPv6 or IPv4 address. Furthermore, besides the destination option, such IP field/option can be in form of other kinds of IPv6 extension headers, such as a routing header, etc.

In one implementation, when the care-of address option is present in an IPv6 packet, the following rules are followed. 1) Such option must not be modified by the intermediate router, except by a PGN GW performing the home agent function and processing this packet based on an existing binding cache entry. 2) Such option, if is not recognized/supported by any destination node, the destination node may reply with an ICMP error message, for example, an ICMP Parameter Problem, Code 2, message to the source IP address of the packet carrying such option. 3) Such option can be generated or processed only by a PGW that performs the home agent function. Any other kind of intermediate nodes should silently ignore this option or keep this option intact. 4) When a PGW receives and processes a reverse-tunneled packet appearing from the UE based on an existing binding cache entry, if the received packet does not contain such option, the PGW must generate one option before forwarding such packet to the destination IP address in the inner IP packet; if the received packet contains such option, the PGW verifies such option only if the received packet appears a binding update message to this PGW; if the received packet does not appear a binding update message and contains such IP field/option, the PGW must remove the existing IP field/option and generate a new option and include such new option in the forwarded packet, if needed. If such packet does not need to be forwarded again, the PGW ignores such option.

5) To generate such option, the PGW takes the care-of address of the UE (usually the source IP address of the outer IP header) and applies, for example, a secure hash function on such care-of address. The output, denoted by H(care-of address) is included in this option. The same cryptography algorithm must be used among different PGWs. A standard forum must specify what algorithm should be used. 6) To verify such option, the PGW takes the care-of address that the UE wants to register with the PGW (usually the source IP address of the received IP packet or the IP address carried in the Alternative Care-of Address mobility option, if presented) and applies the same hash function for generating such option to such care-of address. If the result matches with the Masked Care-of Address field, then the PGW accepts such care-of address and updates the corresponding binding cache entry. Otherwise, the PGW rejects such binding update message.

Figure 8:
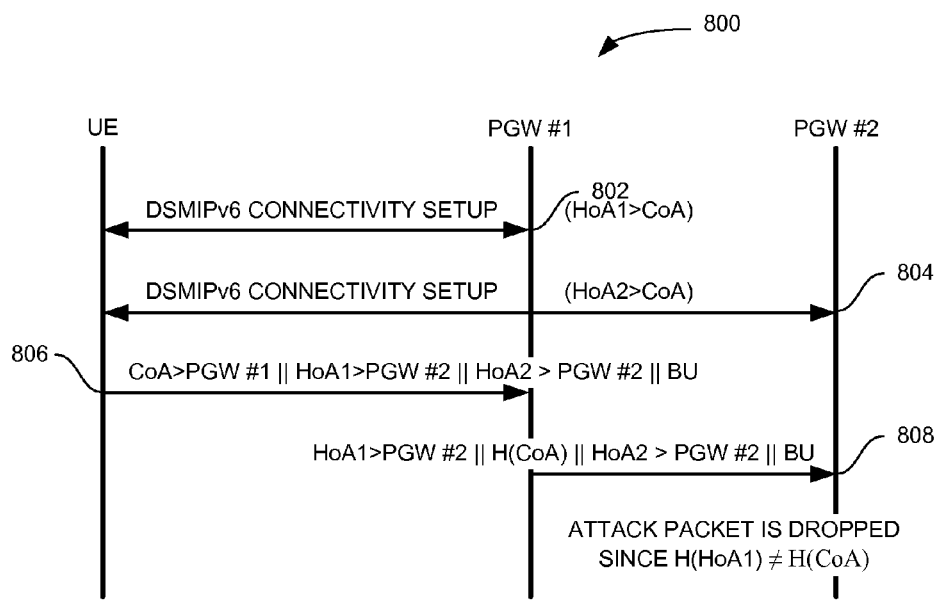
FIG. 8 illustrates an example procedure for preventing the formation of a routing loop in a network.

FIG. 8 illustrates an example procedure 800 (which includes use of a care-of address option) for preventing the formation of a routing loop in a network. In step 802, a (malicious) UE connects to PGW #1 using DSMIPv6 and a binding cache entry is established at PGW #1, denoted by (HoA1→CoA) where the home address allocated by PGW #1 is HoA1 and the care-of address is CoA. In step 804, similarly, the malicious UE connects to PGW #2 using DSMIPv6 and a binding cache entry is established at PGW #2, denoted by (HoA2→CoA) where the home address allocated by PGW #2 is HoA2 and the care-of address is CoA. In step 806, the malicious UE sends a malicious packet, CoA→PGW #1‖HoA1→PGW #2‖HoA2→PGW #2‖BU, in order to update the care-of address at PGW #2 to be HoA1. The part of HoA2→PGW #2 may be encrypted. When PGW #1 receives this packet, and since this packet does not appear as a binding update message to PGW #1 and there is no care-of address option included, PGW #1 generates a care-of address option, denoted by H(CoA) and includes the care-of address option in the forwarded packet (step 808)—i.e. HoA1→PGW #2‖H(CoA)‖HoA2→PGW #2‖BU. When PGW #2 receives this packet, since this packet is a binding update message to PGW

2 and there is a care-of address option, PGW #2 verifies this option. Since the care-of address the malicious UE wants to register with PGW #2 is HoA1 and H(HoA1) does not match H(CoA), PGW #2 rejects this binding update message.

Figure 9:
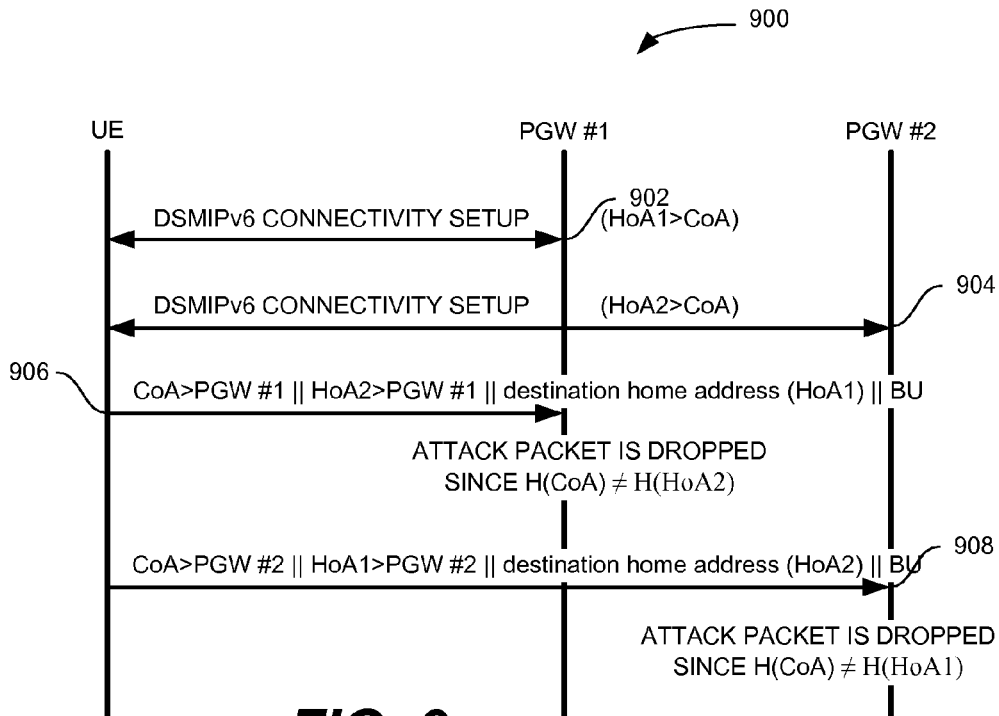
FIG. 9 illustrates an example procedure for preventing the formation of a routing loop in a network.

FIG. 9 illustrates an example procedure 900 (which includes use of a care-of address option) for preventing the formation of a routing loop in a network.

In step 902, a (malicious) UE connects to PGW #1 using DSMIPv6 and a binding cache entry is established at PGW #1, denoted by (HoA1→CoA) where the home address allocated by PGW #1 is HoA1 and the care-of address is CoA. In step 904, the malicious UE connects to PGW #2 using DSMIPv6 and a binding cache entry is established at PGW #2, denoted by (HoA2→CoA) where the home address allocated by PGW #2 is HoA2 and the care-of address is CoA. In step 906, the malicious UE sends a malicious packet, CoA→PGW #1∥HoA2→PGW #1∥home address destination option (HoA1)∥BU, in order to update the care-of address at PGW #1 to be HoA2. When PGW #1 receives this packet, since this packet does not contain a care-of address option, PGW #1 generates such option—i.e. H(CoA). Such option is included in the decapsulated packet, HoA2→PGW #1∥H(CoA)∥home address destination option (HoA1)∥BU. Since the destination IP address is PGW #1 again and the forwarded packet appears to be a binding update message, PGW #1 verifies the option. PGW #1 rejects such binding update message because H(CoA) is not equal to H(HoA2). Similarly, (in step 908) the malicious UE tries to update the care-of address at PGW #2 to be HoA1. PGW #2 can detect the attack by generating and verifying the care-of address option. Such malicious message will be dropped.

Routing Loop Detection Mechanism

With a routing loop detection mechanism, once upon reception of a data packet destined at the UE from a correspondent node, after Mobile IP operation (including encryption if required) and the verification as specified below (if there is a routing loop detection option) are completed, the PGW applies a cryptology algorithm on a selected number. Such number can be random, for example, the PGW applies a cryptology algorithm on the inner packet or the encrypted inner packet (if the encryption is required), for example, the output2=H(the inner packet or the encrypted inner packet). The PGW may use other methods to select a number. Then the PGW uses one same or different cryptology algorithm, for example, a keyed hash function, on such number, i.e., the output1=H(key, the output2). Such keyed hash function can be for example, HMACSHA1. Note that the secret key used in this calculation must not be disclosed to other entities.

The output1 and the output2 are included in an IP field/option that is added into the packet to be forwarded. In one implementation, such option must not be modified by any other intermediate router during packet forwarding and must be placed in the clear text if additional encryption is applied. As an example, such IP field/option can be a new type of IPv6 destination option, called "loop detection" option.

Figure 10:
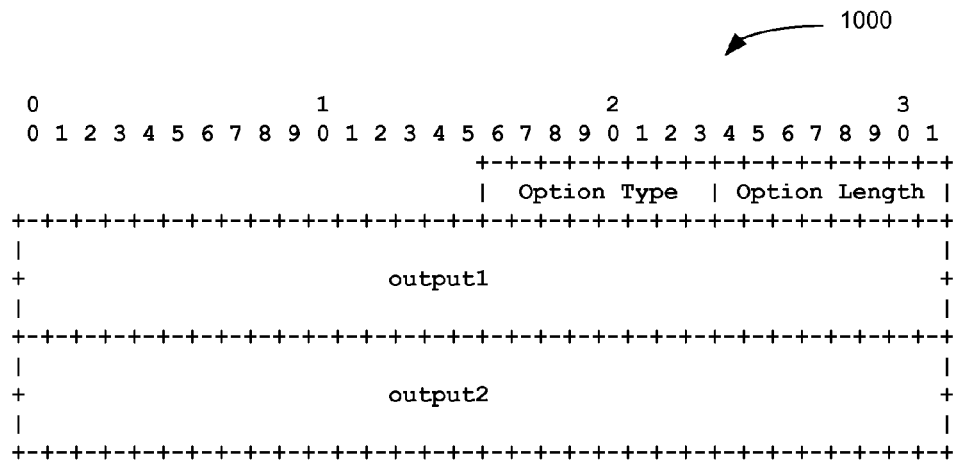
FIG. 10 illustrates an example format of a loop detection option.

FIG. 10 shows an example format 1000 of such a loop detection option. In one implementation, the Option Type is assigned by IRNA to uniquely identify the loop detection option. In one implementation, the length of the option is indicated by an 8-bit unsigned integer, and corresponds to the length of the option, in octets, excluding the Option Type and Option Length fields. In one implementation, the length field is set to 32 if the HMACSHA1 output is 128 bits. When generated, Output1 should be H(key, the output2). Output2 corresponds to a number that may be generate by H(the inner packet or the encrypted inner packet) or other means. Note that the format 1000 shown in FIG. 10 is just an example and other formats are possible. Note that other kinds of IPv6 extension headers can be used, besides the destination option.

In one implementation, the following rules are employed when implementing a loop detection option. 1) Such option must not be modified by the intermediate router. 2) Such option, if it is not recognized/supported by any destination node, the destination node may reply with an ICMP error message, for example, an ICMP Parameter Problem, Code 2, message to the source IP address of the packet carrying such option. 3) Such option can be generated or processed only by a PGW that performs the home agent function. Any other kind of nodes should silently ignore this option or keep this option intact when forwarding. 4) Once upon reception of a data packet destined at the UE, if there is such a new option in the packet, the PGW must verify such option based on whether the output1 is equal to hash1 (Key, the output2). Note that both the output1 and the output2 are carried in the option. If yes, then this packet is in a routing loop and dropped by the PGW; otherwise, the PGW processes such packet by adding another option. If there are multiple such options, the PGW must verify each option until it concludes that this packet is forwarded through a routing loop. 5) When a PGW receives a packet destined at the UE, if the received packet does not contain such loop detection option or such packet does not go through a routing loop, the PGW generates one such option before forwarding such packet to the destination IP address in the outer IP packet.

Figure 11:
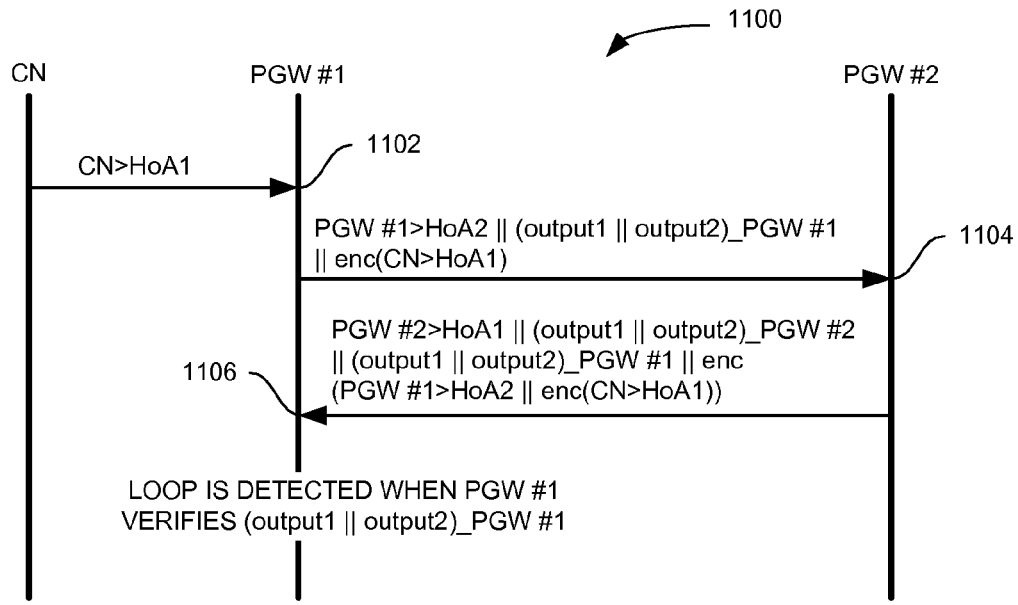
FIG. 11 illustrates an example procedure for detecting a routing loop in a network.

FIG. 11 illustrates an example procedure 1100 for detecting a routing loop in a network using a loop detection option. Assume that the binding cache entries established at PGW #1 and PGW #2 form a routing loop. That is, the care-of address registered at PGW #1 is HoA2 and the home address allocated by PGW #1 to the UE is HoA1, while the care-of address registered at PGW #2 is HoA1 and the home address allocated by PGW #2 to the UE is HoA2. In step 1102, PGW #1 receives a packet, CN→HoA1 (destined for the UE), from the correspondent node. Based on the binding cache entry, PGW #1 needs to forward such packet the HoA2. PGW #1 encapsulates such packet and generates a new IP field/option (including both the output1 and the output2) (step 1104). Such packet can appear as follows, PGW #1→HoA2∥(output1∥output2) PGW #1∥encryption(CN→HoA1). In this example, we assume that the inner packet is encrypted. Note that the new option shall not be encrypted. When PGW #2 receives such forwarded packet, based on its binding cache entry, PGW #2 decides to forward the packet to HoA1. PGW #2 encapsulates such packet and generates a new IP field/option (including both the output1 and the output2) (step 1106). Such packet can appear as follows: PGW #2→HoA1∥(output1∥output2)_PGW #2∥(output1∥output2) PGW #1∥encryption (PGW #1→HoA2∥encryption(CN→HoA1)). In this example, we assume that the inner packet is encrypted. Note that the new option shall not be encrypted. When PGW #1 receives such packet, PGW #1 verifies the included options. The routing loop is detected when PGW #1 verifies (output1∥output2) PGW #1 based on the processing rule described above.

Second Set of Routing Loop Detection Mechanisms

Figure 12:
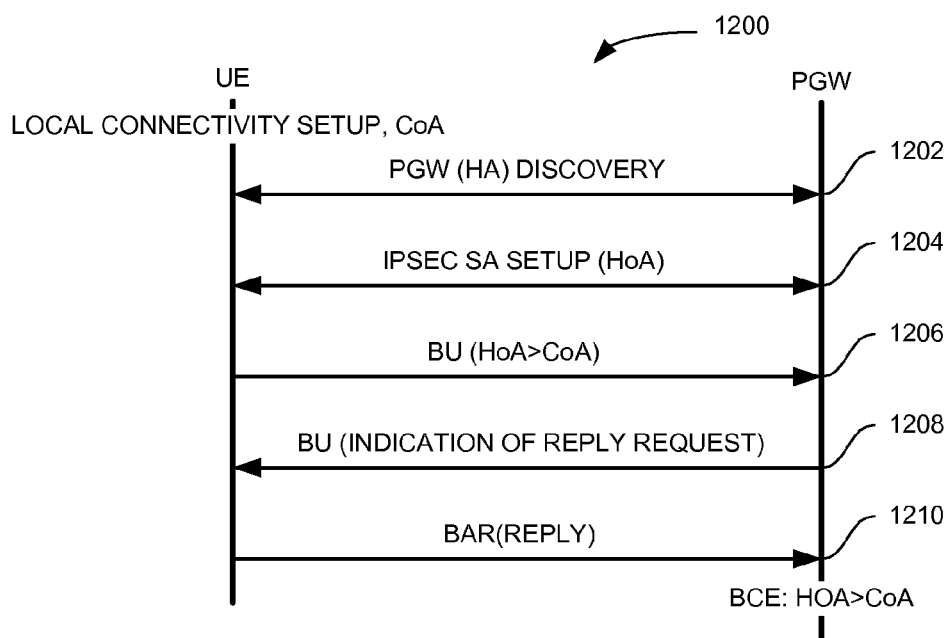
FIG. 12 illustrates an example procedure for exchanging messages to prevent the formation of a routing loop in a network.

Within this set of routing loop prevention mechanisms, the first option is to extend the original binding update procedure into a three-way handshake procedure 1200 as shown in FIG. 12.

Referring to FIG. 12, a UE connects to an access network and decides to use DSMIPv6 to connect to a specific PGW. The UE configures an IP address on its interface. This IP address is a care-of address when the UE attaches to a foreign link. In step 1202, the UE discovers the IP address of the PGW performing the home agent function, for example by DNS or DHCP. In step 1204, the UE sets up the IPsec security association with the PGW and obtains a home address during this procedure. The UE performs the home link detection during this step. In step 1206, the UE sends a binding update (BU) message to the PGW to bind its home address to its care-of address. When the PGW receives this binding update message, the PGW replies with a mobility signaling message (for example, a existing mobility signaling message with some extension or a new type of mobility signaling message), with an indication of request a reply (step 1208). Such message is sent to the care-of address that the UE wants to register. Furthermore, the PGW may create a "temporary" binding cache entry (HoA→CoA) and buffers any data packet destined at the UE's home address, i.e., HoA, however, the PGW does not forward such data packets until the reply from the UE is received or a specific timer expires.

When the UE receives such mobility signaling message from the PGW, the UE replies to the PGW by sending a mobility signaling message (step 1210). Such message can be a new type of mobility signaling message, for example, a binding acknowledgement reply message as shown in FIG. 12, or a existing type of mobility signaling message with certain extensions. After receiving the reply from the UE, the PGW must verify the received reply is really in response to the previously sent request. If so, the PGW updates the status of the corresponding binding cache entry, remove the timer and starts to forward the packets destined at the UE, if any. If the PGW does not receive a valid reply before an associated timer expires, the PGW deletes such temporary binding cache entry.

As described above, certain new type of mobility signaling messages and/or some extensions to the existing mobility signaling messages are needed. In the following, we discuss such extensions and certain design choices. Hereinafter, the mobility signaling message sent at the step 1208 from the PGW to the UE is referred to as the "request", and the mobility signaling message sent in step 1210 from the UE to the PGW is referred to as the "reply". To send a request to the UE, the PGW can use either an existing mobility signaling message with some extension or a new type of mobility signaling message that carries some indication of requesting a reply.

If using an existing signaling message, for example, a binding acknowledgement message, the PGW can include a new or existing type of mobility option as an indication of requesting a reply. Such new type of mobility option can carry a random number generated or selected by the PGW. The PGW can use such mobility option to verify whether the received reply sent by the UE (at the step 6) is in response to the request sent by the PGW (at the step 1208): for example, if the reply received at the step 6 carries a same number in such mobility option, then the PGW accepts such reply; otherwise the PGW rejects such reply. There are multiple ways to select or generate such random numbers in this new type of mobility option; for example, the PGW selects a random number from a pool and includes such random number in the new type of mobility option; furthermore, the PGW saves the selected random number in the corresponding temporary binding cache entry.

If using a new type of signaling message, the type of such signaling message may indicate the request of a reply. The PGW can also include a new type of mobility option for verifying the received reply. To send the reply from the UE to the PGW, the UE can use either an existing mobility signaling message (for example another binding update message) with some extension or a new type of mobility signaling message. In one implementation, such message must return the same random number received in the "request" in a new or existing mobility option to the PGW. Note that such signaling messages must be protected by the existing security mechanism between the PGW and the UE, for example, an IPSec security message used to protect the binding update and acknowledgement. Within this set of routing loop prevention mechanisms, the second option is to use the generic signaling message together with the binding update and acknowledgement— FIG. 13 shows such a procedure.

Figure 13:
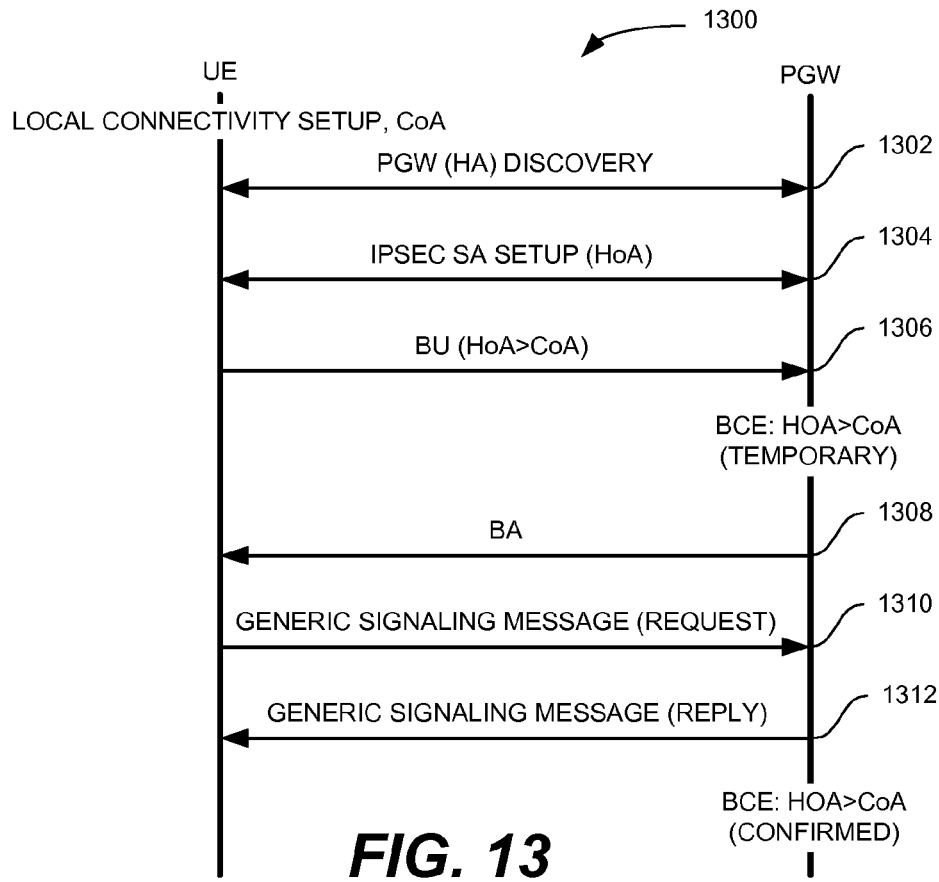
FIG. 13 illustrates an example procedure of using generic signaling to prevent the formation of a routing loop in a network.

Specifically, FIG. 13 illustrates an example procedure 1300 for using generic signaling to prevent routing loop formation in a network. The UE connects to an access network and decides to use DSMIPv6 to connect to a specific PGW. The UE configures an IP address on its interface. This IP address is a care-of address when the UE attaches to a foreign link. In step 1302, the UE discovers the IP address of the PGW performing the home agent function, for example by DNS or DHCP. In step 1304, the UE sets up the IPSec security association with the PGW and obtains a home address during this procedure. The UE performs the home link detection during this step. In step 1306, the UE sends a binding update message to the PGW to bind its home address to its care-of address. When the PGW receives this binding update message, the PGW may create a "temporary" binding cache entry (HoA→CoA) and buffers any data packet destined at the UE's home address, i.e., HoA, however, the PGW does not forward such data packets until a valid generic signaling message (reply) from the UE is received. Or if a specific timer expires, the PGW drops the buffered packets. In step 1308, the PGW replies with a normal binding acknowledgement (BA). Note such BA message may be sent after a valid generic signaling message is received by the PGW. In step 1310, the PGW sends a generic signaling message with a subtype as a request. Such message may include a mobility option that carries a random number, as described above. When the UE receives such generic signaling message with request subtype from the PGW, the UE replies to the PGW by sending a generic signaling message with Acknowledgement subtype (step 1312). The same random number received at the step 1308 can be included in the same type of mobility option and returned to the PGW. After receiving the generic signaling message with Acknowledgement subtype from the UE, the PGW must verify the received message is really in response to the previously sent generic signaling message with request subtype by comparing the random number received with the one sent. If match, the PGW updates the status of the corresponding binding cache entry, remove the timer and starts to forward the packets destined at the UE, if any. If the PGW does not receive a valid generic signaling message with Acknowledgement subtype before an associated timer expires, the PGW deletes such temporary binding cache entry.

Figure 14:
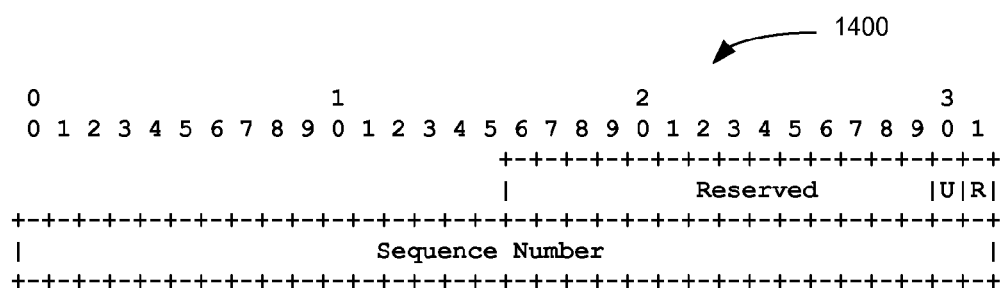
FIG. 14 illustrates an example format of a heartbeat message.
Figure 15:
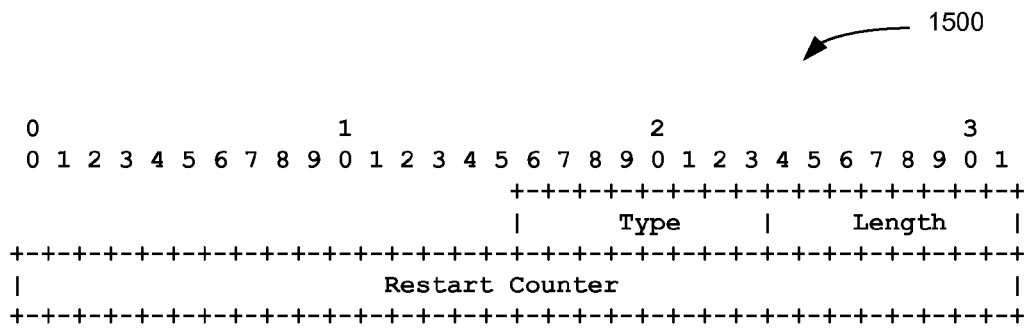
FIG. 15 illustrates an example format of a restart counter mobility option.

Within this set of routing loop prevention mechanisms, the third option is to use the heartbeat mechanism (that is originally designed in PMIP for the LMA and the MAG to detect reachability and reboot of each other) together with the binding update and acknowledgement. As shown in FIGS. 14-15, the sequence number field in the Heartbeat message is used to detect the reachability of the LMA and the MAG and the Restart Counter Mobility Option is used to detect whether there is a reboot in the MAG or the LMA before. In particular, FIG. 14 illustrates an example format 1400 of a heartbeat message, and FIG. 15 illustrates an example format 1500 of a restart counter mobility option. However, since the number in either the sequence number field or the restart counter mobility option is easy to guess, in order to use the heartbeat message for detecting the malicious attack we described before, the heartbeat message needs to carry a random number in a new type of mobility option. The generation of such random number is the same as before.

Figure 16:
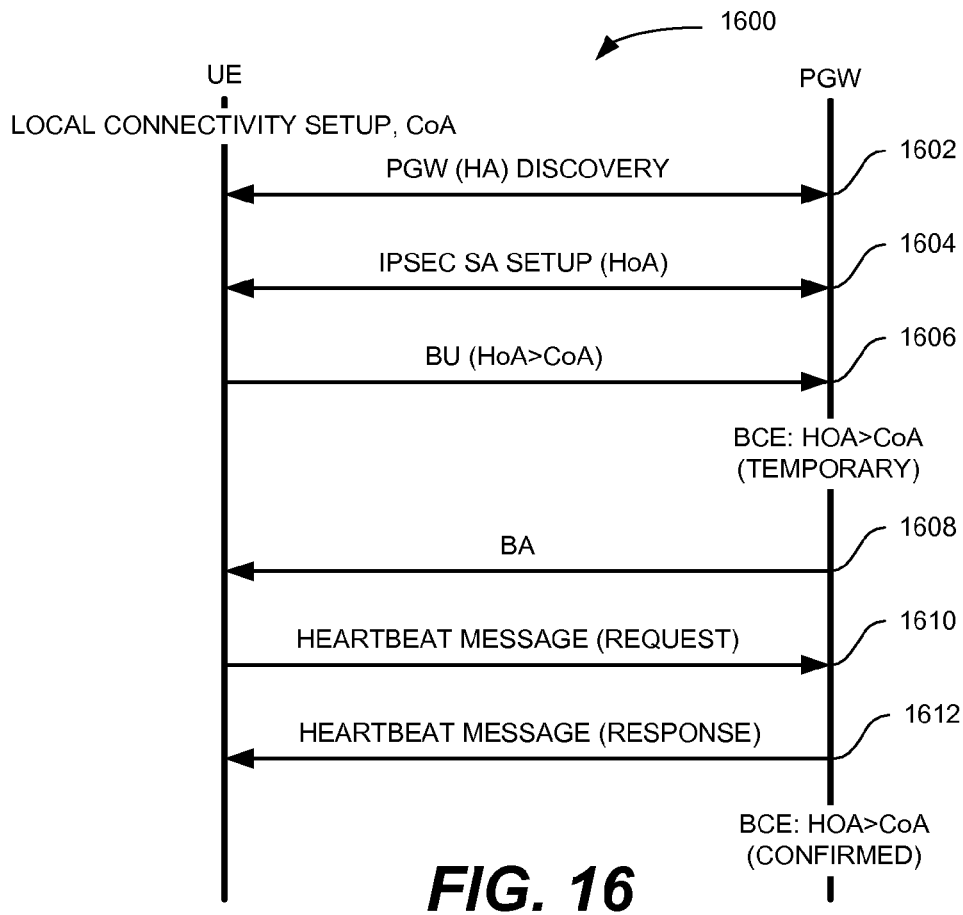
FIG. 16 illustrates an example procedure of using a heartbeat message to prevent the formation of a routing loop in a network.

FIG. 16 illustrates an example procedure 1600 for using a heartbeat message to prevent formation of a routing loop in network. The UE connects to an access network and decides to use DSMIPv6 to connect to a specific PGW. The UE configures an IP address on its interface. This IP address is a care-of address when the UE attaches to a foreign link. In step 1602, the UE discovers the IP address of the PGW performing the home agent function, for example by DNS or DHCP. In step 1604, the UE sets up the IPSec security association with the PGW and obtains a home address during this procedure. The UE performs the home link detection during this step. In step 1606, the UE sends a binding update message to the PGW to bind its home address to its care-of address. When the PGW receives this binding update message, the PGW may create a "temporary" binding cache entry (HoA→CoA), and buffers any data packet destined at the UE's home address, i.e., HoA, however, the PGW does not forward such data packets until a valid heartbeat message (response) is received from the UE; Or if a specific timer expires, the PGW drops the buffered packets. In step 1608, the PGW replies with a normal binding acknowledgement. Note such BA message may be sent after a valid heartbeat response message is received by the PGW. In step 1610, the PGW sends a heartbeat request message. Such message may include a mobility option that carries a random number, as described above. When the UE receives such heartbeat request message from the PGW, the UE replies to the PGW by sending a heartbeat response message (step 1612). The same random number received at the step 1610 can be included in the same type of mobility option and returned to the PGW. After receiving the heartbeat response message from the UE, the PGW must verify the received message is really in response to the previously sent heartbeat request message by comparing the random number received with the one sent. If there is a match, the PGW updates the status of the corresponding binding cache entry, remove the timer and starts to forward the packets destined at the UE, if any. If the PGW does not receive a valid heartbeat response message before an associated timer expires, the PGW deletes such temporary binding cache entry. Note with these three options described above, if the PGW does not receive a valid response before the timer expires, the PGW may send indication of such problem in a message to any address at which the PGW knows that the UE may be reachable.

Figure 17:
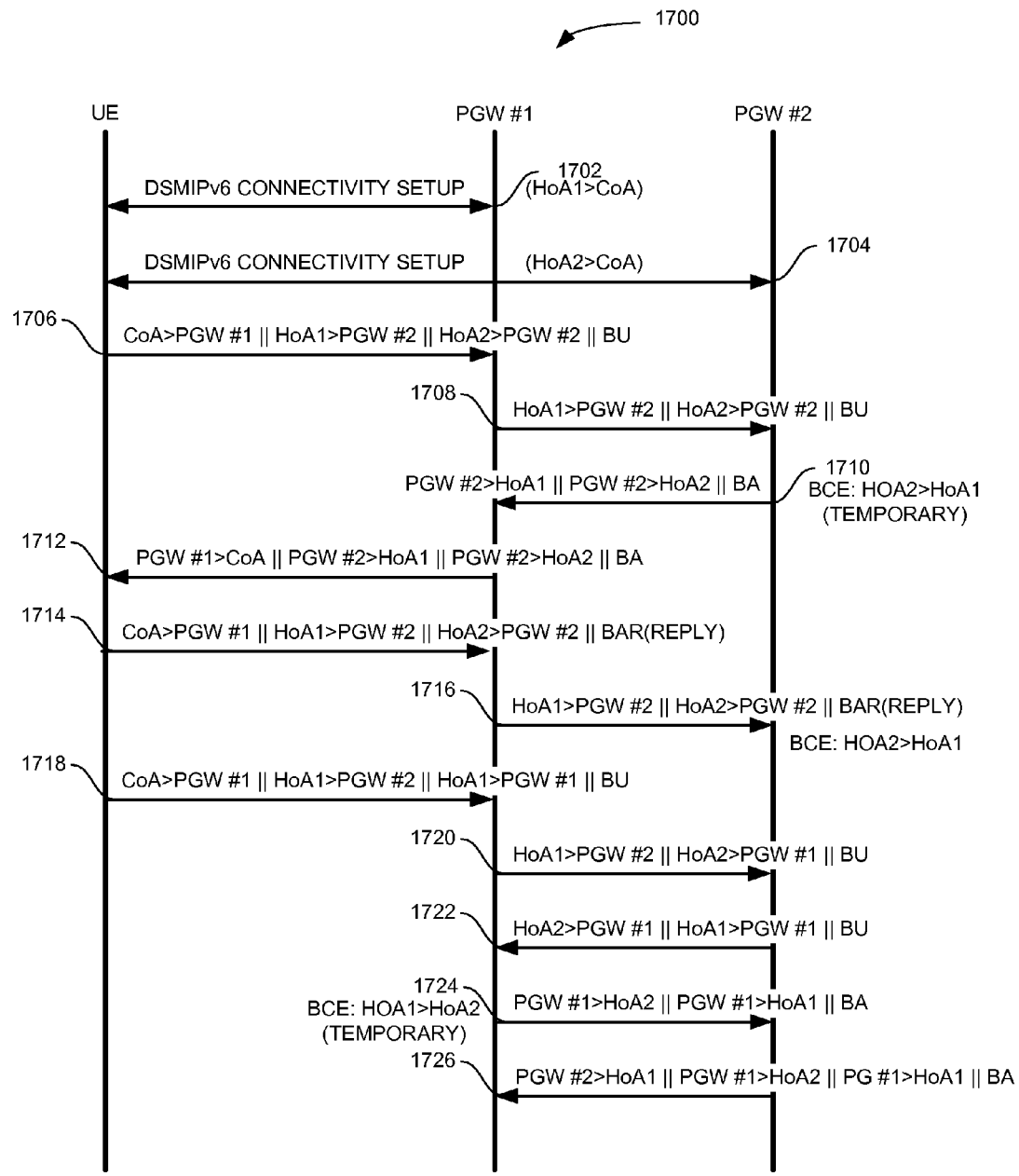
FIG. 17 illustrates an example procedure for preventing the formation of a routing loop in a network.

FIG. 17 illustrates an example three way handshake procedure 1700 for preventing the formation of a routing loop in a network. In step 1702, a (malicious) UE sets up connectivity to PGW #1 by using the three-way handshake procedure as described above. The confirmed binding cache entry at PGW #1 is as follows: HoA1→CoA. In step 1704, the malicious UE sets up connectivity to PGW #2 by using the three-way handshake procedure as described above. The confirmed binding cache entry at PGW #1 is as follows: HoA2→CoA. In step 1706, the malicious UE sends the following message: CoA→PGW #1||HoA1→PGW #2||HoA2→PGW #2||BU. Such message is received by PGW #1 and the following message is forwarded to PGW #2: HoA1→PGW #2||HoA2→PGW #2||BU (step 1708). Since such message can appear as a binding update message to PGW #2, PGW #2 processes the message and sets up a temporary binding cache entry: HoA2→HoA1. And PGW #2 replies with the following message: PGW #2→HoA1||PGW #2→HoA2||BA (indication of reply request) (step 1710). Such message is received by PGW #1 and reversed tunneled to the malicious UE. PGW #1→CoA||PGW #2→HoA1||PGW #2→HoA2||BA (indication of reply request) (step 1712). When the UE receives such message, the UE generates a reply: CoA→PGW #1||HoA1→PGW #2||HoA2→PGW #2||BAR (reply) (step 1714). Such reply is received by PGW #1 and forwarded to PGW #2: HoA1→PGW #2||HoA2→PGW #2||BAR (reply) (step 1716). After verification, PGW #2 updates the status of the corresponding binding cache entry. In order to create a routing loop, the UE sends the following message: CoA→PGW #1||HoA1→PGW #2||HoA2→PGW #1||HoA1→PGW #1||BU (step 1718). After PGW #1 receives such message, PGW #1 forwards the following message to PGW #2: HoA1→PGW #2||HoA2→PGW #1||HoA1→PGW #1||BU (step 1720).

Since PGW #2 has a binding cache entry for the UE: HoA2→HoA1. PGW #2 forwards such message to PGW #1: HoA2→PGW #1||HoA1→PGW #1||BU (step 1722). Since this message can appears as a binding update message to PGW #1, PGW #1 creates a temporary binding cache entry: HoA1→HoA2 after verifying this message. PGW #1 also sends the following message: PGW #1→HoA2||PGW #1→HoA1||BA (indication of reply request) (step 1724). When PGW #2 receives this message, PGW #2 reverse-tunnels this packet to HoA1 since the binding cache entry shows HoA2→HoA1. The forwarded message can appear as follows: PGW #2→HoA1||PGW #1→HoA2||PGW #1→HoA1||BA (indication of reply request) (step 1726). Such packet will arrive at PGW #1. However, since the binding cache entry at PGW #1 is not verified yet, PGW #1 buffers such packet without processing the packet. When the associated timer expires, PGW #1 deletes the temporary binding cache entry. Therefore the routing loop is not formed.

Figure 18:
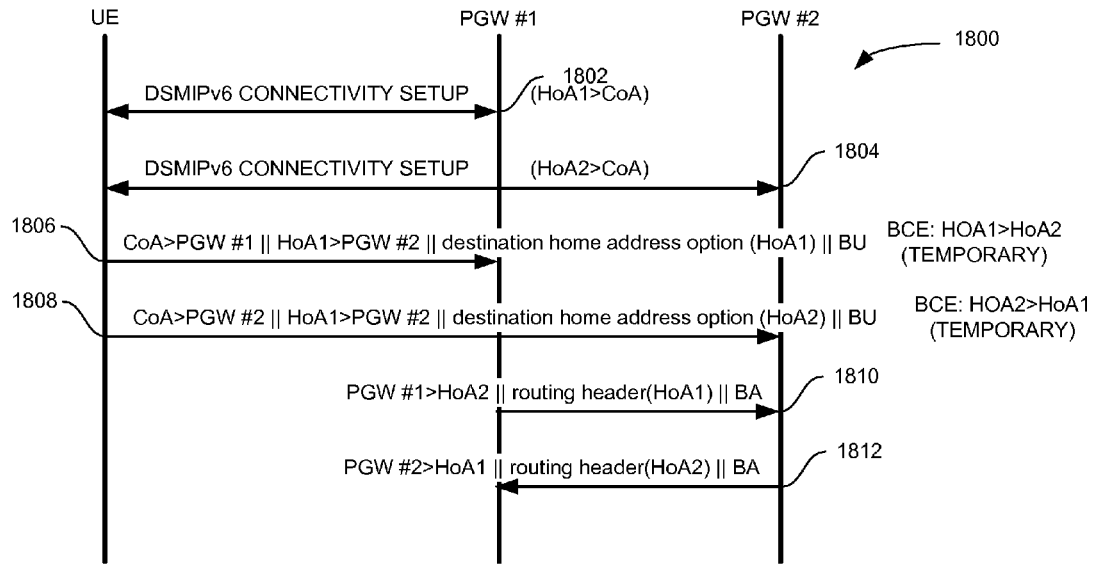
FIG. 18 illustrates an example procedure for preventing the formation of a routing loop in a network.

FIG. 18 illustrates an example three way handshake procedure 1800 for preventing the formation of a routing loop in a network. In step 1802, a (malicious) UE sets up connectivity to PGW #1 by using the three-way handshake procedure as described above. The confirmed binding cache entry at PGW #1 is as follows: HoA1→CoA. In step 1804, the malicious UE sets up connectivity to PGW #2 by using the three-way handshake procedure as described above. The confirmed binding cache entry at PGW #1 is as follows: HoA2→CoA. In step 1806, the malicious UE sends the following message: CoA→PGW #1||HoA2→PGW #1||destination home address option (HoA1)||BU. PGW #1 will create a temporary binding cache entry: HoA1→HoA2. Simultaneously, the malicious UE sends the following message: CoA→PGW #2||HoA1→PGW #2||destination home address option (HoA2)||BU (step 1808). PGW #2 will create a temporary binding cache entry: HoA2→HoA1. After receiving such binding update message, PGW #1 sends back a mobility signaling message to request a reply (step 1810). Such message can appear as follows: PGW #1→HoA2||routing header (HoA1)||BA(indication of reply request). Such message will be received by PGW #2, however PGW #2 does not forward such message because the corresponding binding cache entry is not yet verified. After receiving such binding update message, PGW #2 sends back a mobility signaling message to request a reply (step 1812). Such message can appear as follows: PGW #2→HoA1||routing header(HoA2)||BA(indication of reply request). Such message will be received by PGW #1, however PGW #1 does not forward such message because the corresponding binding cache entry is not yet verified. After the timer expires, PGW #1 and PGW #2 delete their corresponding binding cache entries. Therefore a routing loop is not formed. The procedures for how a generic signaling message and a heartbeat message can be used to prevent a routing loop from being formed are similar to what is described above.

One or more of the procedure steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 19:
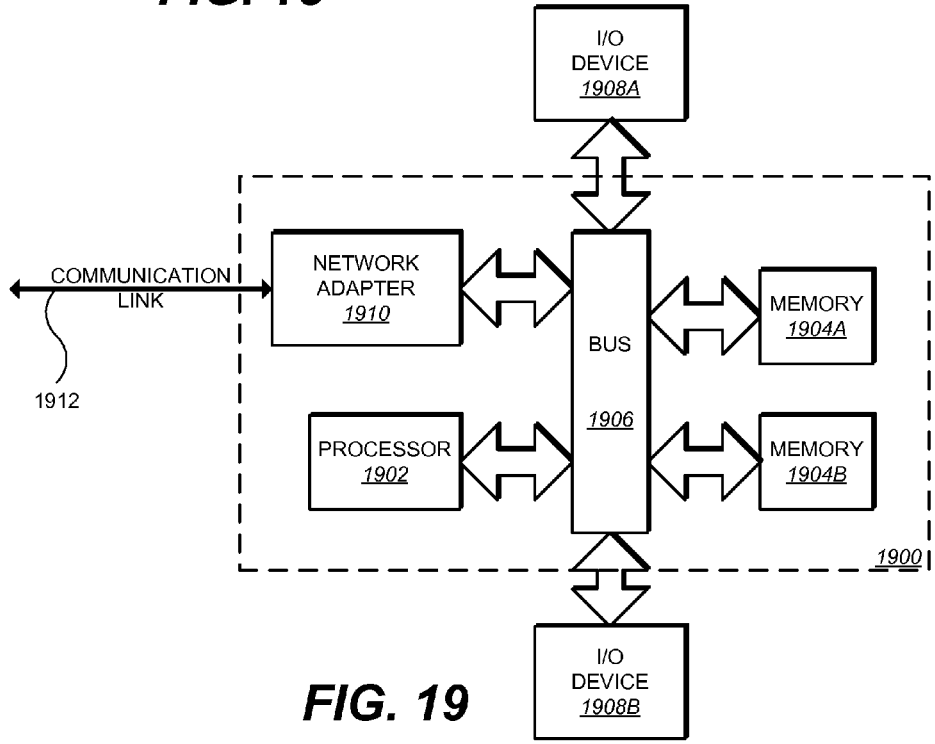
FIG. 19 is a block diagram of a data processing system suitable for storing and/or executing program code.

FIG. 19 illustrates a data processing system 1900 (e.g., a UE) suitable for storing and/or executing program code. Data processing system 1900 includes a processor 1902 coupled to memory elements 1904A-B through a system bus 1906. In other implementations, data processing system 1900 includes more than one processor and each processor can be coupled directly or indirectly to one or more memory elements through a system bus. Memory elements 1904A-B can include local memory employed during actual execution of the program code, bulk storage, and cache memories that provide temporary storage of at least some program code in order to reduce the number of times the code must be retrieved from bulk storage during execution. As shown, input/output or I/O devices 1908A-B (including, but not limited to, keyboards, displays, pointing devices, etc.) are coupled to data processing system 1900. I/O devices 1908A-B may be coupled to data processing system 1900 directly or indirectly through intervening I/O controllers (not shown).

In one implementation, a network adapter 1910 is coupled to data processing system 1900 to enable data processing system 1900 to become coupled to other data processing systems or remote printers or storage devices through communication link 1912. Communication link 1912 can be a private or public network. Modems, cable modems, and Ethernet cards are just a few of the currently available types of network adapters.

Although the subject matter has been described in language specific to structural features and/or methodological operations, the subject matter defined in the appended claims is not necessarily limited to the specific features or acts described above, including orders in which the acts are performed.

What is claimed is:

1. A method for preventing a user equipment from forming a routing loop in a network, the user equipment having used a host-based mobility protocol to connect to a plurality of packet data network gateways in the network, the method comprising:

maintaining a list of one or more home addresses associated with the user equipment, each home address having been previously associated with the user equipment by a corresponding packet data network gateway, wherein the list of the one or more home address is maintained by an authentication, authorization and accounting (AAA) server within the network;

receiving, by the packet data network gateway from the AAA server, the list of the one or more home addresses associated with the user equipment;

in response to a request to update a care-of address in a binding cache entry of a packet data network gateway in the network, comparing an address to be used to update the care-of address with the one or more home addresses in the list, wherein the comparing is performed by the packet data network gateway; and if the address to be used to update the care-of address matches a home address in the list, then rejecting the request to update to prevent formation of a routing loop in the network between (i) the packet data network gateway and (ii) another packet data network gateway of the plurality of packet data network gateways.

2. The method of claim 1 wherein the host-based mobility protocol is Dual-Stack Mobile Internet Protocol version 6 (DSMIPv6).

3. The method of claim 1 wherein the rejecting of the update occurs during a time that the user equipment is establishing an IKEv2 security association with the AAA server.

4. A method for preventing a user equipment from forming a routing loop in a network, the user equipment having used a host-based mobility protocol to connect to a plurality of packet data network gateways in the network, the method comprising:

maintaining a list of one or more home addresses associated with the user equipment, each home address having been previously associated with the user equipment by a corresponding packet data network gateway, wherein the list of the one or more home address is maintained by an authentication, authorization and accounting (AAA) server within the network;

receiving, by the packet data network gateway from the AAA server, the list of the one or more home addresses associated with the user equipment;

in response to a request to update a care-of address in a binding cache entry of a packet data network gateway in the network, comparing an address to be used to update the care-of address with the one or more home addresses in the list; and if the address to be used to update the care-of address matches a home address in the list, then rejecting the request to update to prevent formation of a routing loop in the network between (i) the packet data network gateway and (ii) another packet data network gateway of the plurality of packet data network gateways, wherein receiving the list of one or more home addresses further comprises receiving, by the packet data network gateway from the user equipment, a request to connect to the packet data network gateway, and in response to receiving the request to connect to the packet data network gateway, receiving the list of one or more home addresses from the AAA server.

5. A method comprising:

receiving, by a packet data network gateway, a list of one or more home addresses associated with a user equipment;

receiving, by the packet data network gateway, a request to update a care-of address in a binding cache entry of the packet data network gateway, wherein the care-of address is associated with the user equipment;

in response to receiving the request to update the care-of address, comparing, by the packet data network gateway, an address to be used to update the care-of address with the one or more home addresses in the list; and in response to the address to be used to update the care-of address matches a home address in the list, rejecting, by the packet data network gateway, the request to update the care-of address in the binding cache entry of the packet data network gateway, wherein the request to update the care-of address is rejected to prevent formation of a routing loop between (i) the packet data network gateway and (ii) another packet data network gateway wherein receiving the list of the one or more home addresses further comprises connecting, by the packet data network gateway, to the user equipment, and in response to connecting to the user equipment, receiving the list of the one or more home addresses.

6. The method of claim 5, wherein the list of the one or more home addresses is received from an authentication, authorization and accounting (AAA) server.

\* \* \* \* \*